June 18, 1968 J. D. BUZAN 3,389,220

TELEVISION SIGNAL GENERATING APPARATUS

Filed Aug. 28, 1964

INVENTOR

JAMES D. BUZAN by

Mason, Kolehmainen, Rathburn and Wyss

ATTORNEYS

United States Patent Office 3,389,220

Patented June 18, 1968

3,389,220

TELEVISION SIGNAL GENERATING APPARATUS

James Dale Buzan, Bloomington, Ind., assignor to Sarkes Tarzian, Inc., Bloomington, Ind., a corporation of Indiana Filed Aug. 28, 1964, Ser. No. 392,723
10 Claims. (Cl. 178—7.1)

ABSTRACT OF THE DISCLOSURE

Television signal generating apparatus in which a video signal from the television camera tube is clamped to an adjustable black level set-up voltage and the clamped video signal is then combined with composite blanking pulses in a circuit in which the blanking pulse level is accurately maintained despite wide variations in the average value of the video signal. A gamma correction circuit is also provided in which the collector-base junction of a transistor is employed to provide a sharp inflection point in the transfer characteristic of the associated amplifier.

Figure 1:
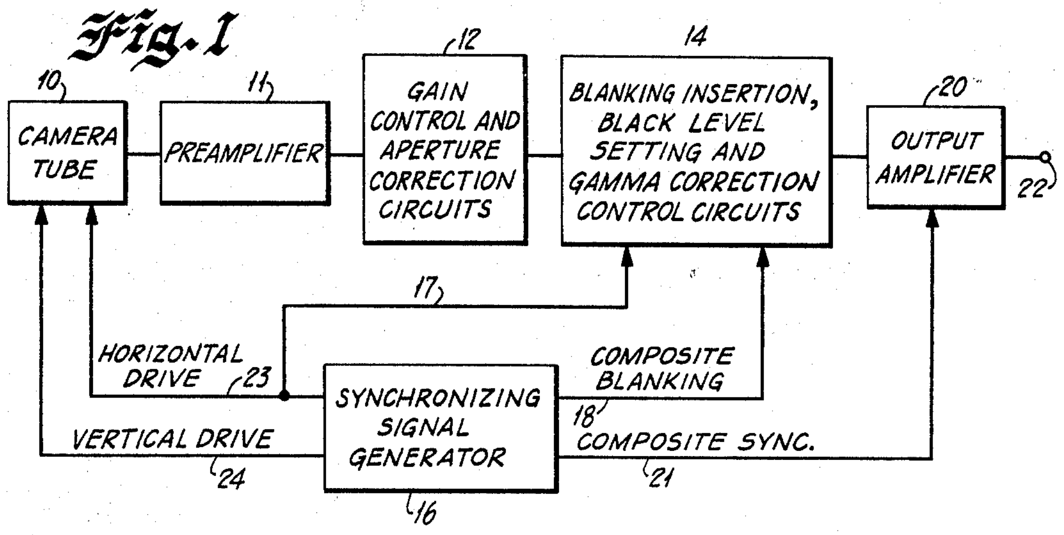

The present invention relates to television signal generating apparatus, and, more particularly, to signal generating apparatus suitable for television broadcasting equipment wherein a signal from the television camera tube is modified and combined with blanking and synchronizing signals to provide a composite signal suitable for broadcasting purposes.

In television signal generating apparatus heretofore proposed, it has been customary to have both a control for adjusting or setting the black level of the picture to a predetermined value and also to have a control for adjusting the gain, i.e., the amplitude of the video signal. However, the black level setting circuit heretofore employed has not been stable, but instead has varied with changes in the scene and the average value or duty cycle of the video signal wave. This has necessitated the assignment of an operator to continually monitor the equipment and to make changes in the black level setting in accordance with changes in the scene being televised.

Also, this operator has had to make appropriate changes in video gain to compensate for changes in black level setting with the result that a considerable amount of time is consumed in "riding" the level setting and gain controls of the equipment due to the fact that the black level setting adjustment does not remain constant under all picture conditions ranging from very dark to very nearly white pictures.

It is, therefore, a primary object of the present invention to provide a new and improved black level setting control circuit which is arranged to maintain the black level of the televised picture at a predetermined value in a fully automatic manner.

It is another object of the present invention to provide a new and improved black level setting control circuit which is capable of setting the black level of the televised picture to a particular value and holding this value despite wide variations in the average value or duty cycle of the video signal wave.

It is a further object of the present invention to provide a new and improved black level setting control circuit which is fully automatic in operation and does not require the continual attendance of an operator to make readjustments thereof.

A further object of the present invention resides in the provision of a new and improved black level setting control circuit which is fully automatic in operation and provides dynamic compensation for changes in the light level of the televised picture so that manual readjustment thereof is not required.

In conventional television signal generating apparatus it is customary to provide a so-called gamma correction circuit which modifies the composite video and blanking signal output in such a manner as to compensate for the non-linear characteristic of the camera tube. These compensation circuits are called gamma correction circuits and usually employ a manually adjustable control for changing the "knee" of the gamma correction curve to provide for different corrective conditions. However, in prior gamma correction circuits the bend at the knee of the gamma curve is relatively gradual, a result which is not desirable in certain instances. For example, when a film is being televised which has been stored for a considerable length of time and has the black portions thereof considerably washed out, it is desirable to provide a sharp knee for the gamma curve so as to maintain the gray and white areas at their previous values while considerably enhancing the black portions of the picture. It is also desirable to provide a gamma correction circuit which will maintain the knee of the gamma curve at the desired value despite dynamic changes in the video signal level.

It is, therefore, a further object of the present invention to provide a new and improved gamma correction circuit which cooperates with the black level setting circuit of the present invention to provide the knee of the gamma curve at an accurately maintained voltage level.

It is a further object of the present invention to provide a new and improved gamma correction circuit wherein a sharp bend is provided at the knee of the gamma curve to facilitate the enhancement of one portion of the light spectrum without altering the normal relationships of other portions of this spectrum.

It is still another object of the present invention to provide a new and improved gamma correction circuit which is direct coupled to the black level setting control and provides a sharp bend at the knee of the gamma curve which may be selectively adjusted to different values to provide different gamma values.

Figure 2:
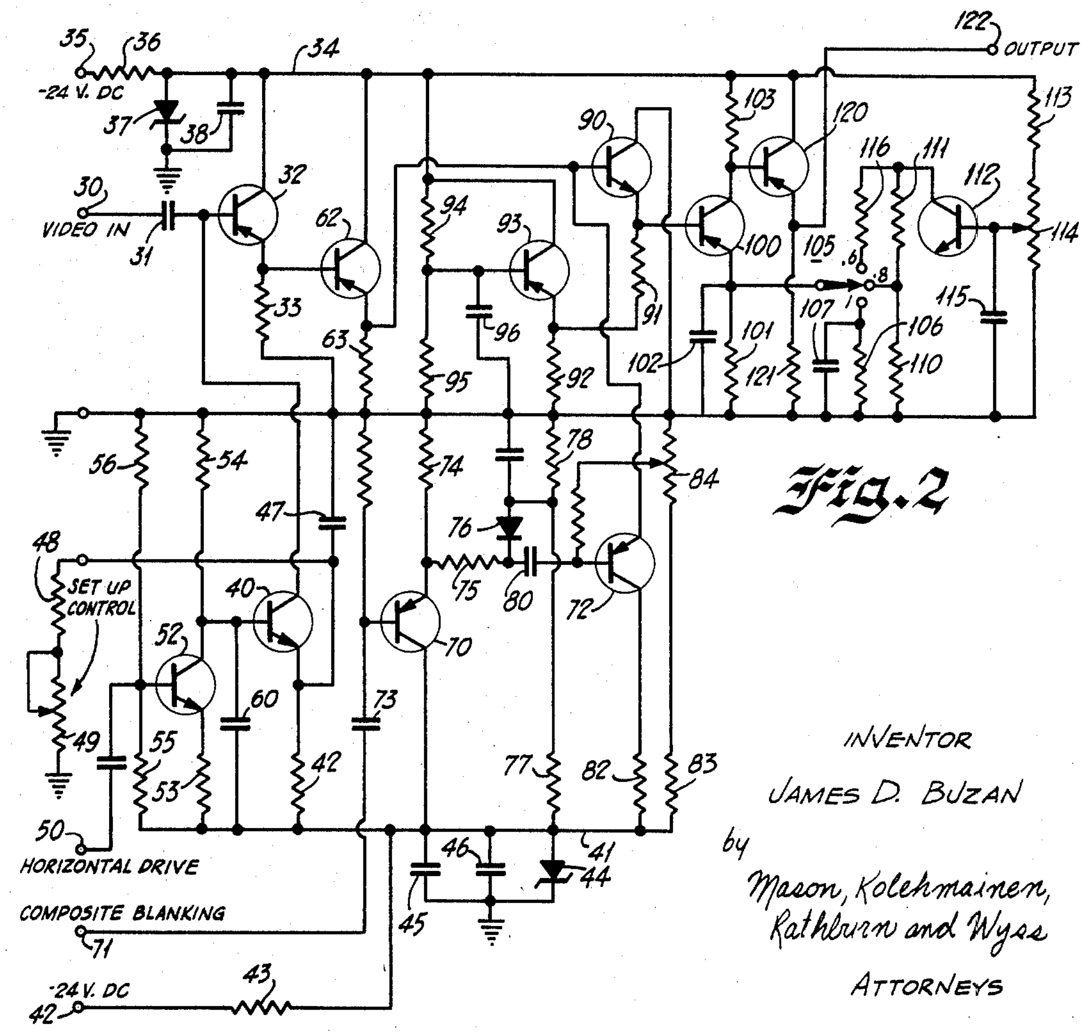

The invention, both as to its organization and method of operation, together with further objects and advantages thereof, will best be understand by reference to the following specification taken in connection with the accompanying drawings in which:

FIG. 1 is a block diagram of a television signal generating apparatus embodying features of the present invention; and FIG. 2 is a schematic diagram of a portion of the apparatus of FIG. 1 showing the circuit arrangement of the present invention in detail.

Referring now to the drawings and more particularly to FIG. 1, the present invention is therein illustrated in connection with signal generating apparatus which comprises generally a camera tube 10, the output of which is connected to a preamplifier 11. The camera tube signal is amplified in the preamplifier 11 and is then supplied to gain control and aperture correction circuits 12. In the circuits 12 the video gain or peak-to-peak amplitude of the video signal may be adjusted by suitable controls and there is also provided suitable circuits for correcting the aperture effect which is produced during scanning within the camera tube 10 as a result of which the reproduced picture elements are broadened and rounded off. The corrected video signal is then applied to blanking insertion, black level setting and gamma correction control circuits 14 where, in accordance with the present invention, the composite blanking signal is inserted into the video signal while providing an accurate and adjustable setting of the black level of the video signal wave relative to the blanking signal. In the circuits 14 there is also provided a correction for the nonlinear characteristic of the camera tube 10 and an adjustment is provided for varying the position of the "knee" of the gamma curve.

In order to accomplish these functions, the circuits 14 are supplied with horizontal drive pulses from the main synchronizing signal generator 16 over the conductor 17 and are also provided with a composite blanking signal from the generator 16 by way of the conductor 18. The composite video and blanking signal output of the circuits 14 is supplied to an output amplifier 20 wherein the composite synchronizing signal is superimposed on the blanking pulses. To this end, a composite synchronizing signal is supplied from the generator 16 by way of the conductor 21 to the output amplifier 20. A composite television signal is thus produced at the output terminal 22 of the system of FIG. 1 which is suitable for use in television broadcasting equipment. The synchronizing signal generator 16 provides suitable horizontal drive pulses which are supplied to the camera tube circuits 10 by way of the conductor 24 so that scanning of the camera tube 10 may be effected in a conventional manner. In this connection it will be understood that the camera tube 10 requires certain auxiliary circuits and power supplied equipment (not shown), a consideration of which is unnecessary to the present invention.

Referring now to FIG. 2 there is therein illustrated the circuit arrangement of the control circuits 14 of the system of FIG. 1. More particularly, the video signal output from the gain control and aperture correction circuit 12 is applied to a video input terminal 30 and through a capacitor 31 to the base of a transistor 32, the emitter of which is connected to ground through a resistor 33 and the collector of which is directly connected to a regulated −10 volt DC conductor 34. The regulated supplied voltage for the conductor 34 is provided from a −24 volt terminal 35 through a dropping resistor 36 and a Zener diode regulator 37, a filter capacitor 38 being connected across the regulator 37 to minimize high frequency fluctuations on the conductor 34.

In accordance with one feature of the invention, there is provided a low impedance on, high impedance off clamping circuit for accurately clamping the video waveform applied to the base of the transistor 32 to a fixed but adjustable DC voltage. More particularly, the base of the transistor 32 is connected to the collector of a clamp transistor 40, the emitter of which is connected to a −10 volt conductor 41 through a resistor 42 and to ground through a bypass capacitor 47. The regulated voltage on the conductor 41 is provided from a −24 volt terminal 42 through a resistor 43 to a Zener diode regulator 44. In order to provide heavy filtering action for the potential on the conductor 41, two filter capacitors 45 and 46 are provided across the Zener diode regulator 44. The emitter of the transistor 40 is also connected through a resistor 48 and a setup control potentiometer 49 to ground. The resistors 42, 48 and potentiometer 49 thus provide a voltage divider network so as to establish a predetermined DC voltage at the emitter of the transistor 40.

Horizontal drive pulses are supplied to the terminal 50 from the synchronizing signal generator 16 and are coupled through a capacitor 51 to the base of a clamping control transistor 52. The emitter of the transistor 52 is connected through a resistor 53 to the conductor 41 and the collector of this transistor is connected through a resistor 54 to ground. The base of the transistor 52 is also suitably biased by means of a voltage divider network consisting of the resistors 55 and 56 connected between the conductor 41 and ground so that the transistor 52 in the absence of an applied signal is saturated or fully conductive. The horizontal drive pulses appied to the terminal 50 are of negative polarity. The emitter resistor 53 is very small so that during periods when the transistor 52 is fully conductive, the collector of this transistor is at approximately the minus 10 volt potential of the conductor 41. This means that the clamp transistor 40 is normally fully cut off since the base of this transistor is normally at minus 10 volts due to the action of the transistor 52. The transistor 52 thus enhances the cutoff of the clamp transistor 40 so that this transistor has a very high impedance at the collector thereof during the off periods of clamp transistor 40. This means that the capacitor 31 is presented with a high impedance insofar as the transistor 40 is concerned between clamping periods.

During the horizontal drive pulses, the negative pulses applied to the base of the transistor 52 render this transistor nonconductive so that the collector voltage thereof rises and renders the clamp transistor fully conductive. As a result, the potential at the base of the transistor 32 is clamped to the DC potential established by the voltage divider 42, 48 and 49 during periods when the horizontal drive pulse is applied to the terminal 50. In this manner, the video signal applied to the base of the transistor 32 is clamped to the voltage established at the emitter of the transistor 40 during the horizontal retrace intervals in which the horizontal drive pulses are produced.

During these horizontal drive pulse intervals, a so-called dark current pulse is produced due to the current produced by the camera tube when no light is present as a result of the emission of the photosensitive surface thereof, and a certain period of time is required for this dark current pulse to reach the minimum voltage level in the camera tube circuit 10. Accordingly, a capacitor 60 is connected between the collector of the transistor 52 and the conductor 41. The capacitor 60 provides a delay of the leading edge of the horizontal drive pulses of about 2 microseconds so as to insure that the point at which the video signal applied to the video terminal 30 is clamped occurs in the camera blanking interval and at a point at which the dark current pulse has reached its full amplitude.

It will thus be seen that the transistors 52 and 40 cooperate to provide a positive low impedance clamp for the base of the transistor 32 whereby this base electrode is brought to the DC potential of the emitter of the transistor 40. This positive clamping action is necessary to insure that the condenser 31 will be charged in sufficient time to bring the potential at the base of the transistor 32 to the desired reference voltage at the emitter of the transistor 40 despite wide variations in duty cycle of the video signal wave. Also, it will be noted that since the transistor 40 is cut off substantially by the action of the transistor 52 during the non-clamping intervals, a very high impedance circuit is presented to the capacitor 31 so that this capacitor does not discharge appreciably between clamping intervals. The transistor 32 is connected as an emitter follower, and the voltage produced across the resistor 33 is applied to the base of a second emitter follower transistor 62, the emitter of which is connected through a resistor 63 to ground. The high impedance provided by the transistor 62 presents a relatively light load across the first emitter follower resistor 33 so that the input impedance presented by the transistor 32 to the coupling capacitor 31 is extremely high. Accordingly, the discharge path provided by the input impedance of the transistor 32 is maintained at a high level between clamping periods so that the capacitor 31 does not discharge appreciably between these intervals.

In order to combine the clamped video signal with the composite blanking signal the transistors 70 and 72 are provided. The composite blanking signal applied to the terminal 71 is coupled through a capacitor 73 to the base of the transistor 70, and this transistor is operated as an emitter follower so as to produce a corresponding voltage across the emitter resistor 74 connected between the emitter of the transistor 70 and ground. A clipping circuit is provided to limit the amplitude of the composite blanking pulses to approximately two volts. More particularly, the emitter of the transistor 70 is connected through a resistor 75 to the cathode of a clipping diode 76, the anode of which is connected to a voltage divider comprising the resistors 77 and 78 connected between the conductor 41 and ground. The diode 76 conducts whenever the amplitude of the composite blanking pulses appearing at the emitter of the transistor 70 exceeds a two-volt maximum amplitude, and the limited composite blanking signal is coupled through a capacitor 80 to the base of the transistor 72. The collector of the transistor 72 is connected through a small resistor 82 to the conductor 41 and this transistor is operated as an emitter follower with the emitter load resistor provided by the resistor 63 which is also common to the emitter follower 62. The base of the transistor 72 is biased by means of a voltage divider network including a resistor 83 and a potentiometer 84 connected between the conductor 41 and ground.

The negative composite blanking pulses which are impressed upon the terminal 71 are clipped by means of the diode 76 to a constant two-volt level, and these negative two-volt pulses are impressed upon the base of the transistor 72. The transistor 72 is normally biased so that it is cut off. However, these negative blanking pulses applied to the base thereof render the transistor 72 conductive so that a negative two-volt blanking pulse is superimposed on the video signal appearing across the emitter resistor 63 of the emitter follower 62. The blanking signal is thus inserted into the video signal, and the resultant composite signal is applied to the base of a transistor 90 which is operated as an emitter follower with the emitter resistor 91 thereof connected between the emitter of the transistor 90 and a very precisely regulated voltage appearing across a resistor 92 which is connected between the bottom end of the resistor 91 and ground.

In order to provide a predetermined DC voltage across the resistor 92, there is provided a control transistor 93, the collector of which is connected to the conductor 34 and the emitter of which is connected to the upper end of the resistor 92. A bleeder network including the resistors 94 and 95 are connected between the conductor 34 and ground so as to establish a predetermined potential at the junction of these resistors which is supplied to the base of the transistor 93. A large filter capacitor 96 is connected across the resistor 95 so as to maintain a fixed DC potential on the base of the transistor 93.

The negative blanking pulses thus superimposed upon the video signal and impressed upon the base of the transistor 90 are of sufficient amplitude to insure that the transistor 90 is cut off during blanking periods. Accordingly, during the blanking periods the voltage at the emitter of the transistor 90 becomes the DC voltage produced across the resistor 92 by the control transistor 93. In accordance with an important feature of the invention, the control transistor 93 exercises a compensating action so as to maintain the voltage across the resistor 92 at a fixed value despite wide changes in the average value of the video signal between blanking intervals. Thus, assuming that the potential across the resistor 92 is such that the emitter of the control transistor 93 is at minus 5 volts, and assuming further that the video signal is such that the average value of the video wave at the emitter of the transistor 90 is minus 6 volts, this minus 6 volt signal which is impressed upon the emitter of the control transistor 93 through the resistor 91 causes the transistor 93 to conduct less so that less current is drawn through the transistor 93 in an amount sufficient to match the current drawn through the resistor 91 to provide minus 6 volts at the emitter of the transistor 90 with the result that the potential at he emitter of the control transistor 93 remains at minus 5 volts. In a similar manner, if the potential at the emitter of the transistor 90 becomes minus 4 volts due to an increase in the average value of the video signal, then the control transistor 93 becomes more heavily conductive so as to provide sufficient additional current to supply the current drawn through the resistor 91 and still holds the potential at the emitter of this transistor at minus 5 volts. In this connection, it is pointed out that the bleeder network, including the resistors 94 and 95, draws a much larger current than that required to provide a 5 volt potential across resistor 92. Accordingly, the voltage at the base of the control transistor 93 remains at the fixed value established by the bleeder network 94, 95 and thus permits the transistor 93 to exercise the above-described compensating action. It will also be understood that the transistor 93 is preferably one which is capable of very high speed switching action so that dynamic compensation for changes in the video signal is provided by this transistor to maintain the reference voltage across the resistor 92 substantially constant under changing video levels. In this connection it is noted that a Zener diode regulator cannot be used as a regulated voltage source because the Zener diode must be bypassed with a large capacitor to remove Zener noise components and the long time constant thus required would permit the reference voltage to vary.

It will thus be seen that the arrangement of the present invention provides a black level setting control circuit which is capable of providing an accurate black level setting which is maintained in a fully automatic manner without attendance. Thus, the potential of the video signal during horizontal drive pulses is accurately set to the potential at the emitter of the transistor 40 by means of the clamping action of this transistor and the potential at the emitter of the transistor 40 may be varied by adjusting the setup potentiometer 49 to any desired value. Also, the potential during the horizontal blanking intervals of the combined signal impressed upon the base of the transistor 90 is controlled by the reference voltage produced across the resistor 92 rather than the clamping level of the video wave before it was combined with the blanking pulses. This is because the transistor 90 is driven beyond cutoff during the horizontal blanking intervals and the DC potential across the resistor 92 acts as a fixed reference level to which the bottom of the horizontal blanking pulses are set. By varying the setup control 49 the amount of black level setup above the bottom edge of the blanking pulses can be adjusted to any desired value and due to the above-described regulating action of the control transistor 93 this setup level is accurately maintained despite wide variations in the average value or duty cycle of the video signal wave impressed upon the terminal 30.

The transistor 72, which is employed to insert the horizontal blanking pulses into the video signal wave, also performs the additional function of limiting or clipping the maximum amplitude of the video signal developed across the common emitter load resistor 63. As discussed heretofore, the transistor 72, in the absence of an applied signal, is biased so that this transistor is turned off. Also, a negative blanking signal impressed upon the base of the transistor 72 causes this transistor to conduct and superimpose a negative blanking signal on the video signal developed across the common emitter resistor 63. During the trace intervals when a video signal is present across the resistor 63, the amplitude of the video signal pulses may become sufficiently great to cause the transistor 72 to conduct and thereafter conduction of the transistor 72 will prevent the video signal pulses from increasing in amplitude. The level at which the transistor 72 conducts during maximum or white peak video pulses is set by adjusting the potentiometer 84. However, it will be noted that the adjustment of the potentiometer 84 does not affect the blanking pulse insertion action of the transistor 72 since a sufficiently large negative blanking signal is applied to the base of the transistor 72 to cause this transistor to conduct irrespective of the adjustment of the potentiometer 84.

The composite video and blanking signal thus produced at the emitter of the transistor 90, in which signal the video black level is accurately set with respect to the bottom of the horizontal blanking pulses, is impressed upon the base of a transistor 100 which is employed to provide gamma correction. The emitter of the transistor 100 is connected through a resistor 101 and a small capacitor 102 is connected across this resistor to provide adequate frequency compensation. The collector of the transistor 100 is connected to the conductor 34 through a resistor 103. A gamma correction switch indicated generally at 105 is connected to the emitter of the transistor 100 and is provided with positions corresponding to gamma corrections of 1, .8 and .6. In the gamma 1 position of the switch 105, a resistor 106 and condenser 107 are connected to the emitter of the transistor 100 in parallel with the resistor 101 and the condenser 102. This parallel combination of elements in the emitter circuit of the transistor 100 is arranged to provide linear amplifier action in the transistor 100 so that a gamma correction of unity is provided at the collector of this transistor. When the switch 105 is thrown to the .8 gamma correction a resistor 110 is connected across the resistor 101 in parallel with a diode clipping circuit comprising a series resistor 111 and the collector-base junction of a transistor 112 in series to a point of fixed potential established by a voltage divider network including a resistor 113 and a potentiometer 114. A capacitor 115 is connected from the base of the transistor 112 to ground for filtering purposes. The position of the knee of the gamma curve may be adjusted by adjustment of the potentiometer 114 which determines the point at which the active diode portion of the transistor 112 conducts so as to change the impedance conditions in the emitter circuit of the transistor 100 and hence the slope of the transfer characteristic of this transistor, as will be readily understood by those skilled in the art.

In accordance with a further feature of the invention, the collector-base junction of the transistor 112 is utilized to provide a sharp bend in the transfer characteristic at the desired knee of the gamma curve. The collector-base junction of the transistor 112 provides a much sharper inflection point of the gamma curve than conventional silicon diodes and the present invention makes use of the extremely sharp conduction characteristic of the collector-base junction of a high speed switching transistor to permit enhancement of the black level components, for example, while maintaining the original relationship of white and gray components. In this connection it will be understood that adjustment of the potentiometer 114 will provide for shifting of the position of the knee of the gamma curve to any desired value depending upon the circuit constants.

In the .6 gamma correction position of the switch 105 a resistor 116 is connected in series with the collector-base junction of the transistor 112, and a similar diode clipping action is obtained to provide a sharp bend at the knee of the gamma curve but at a different gamma correction level.

The gamma corrected composite video and blanking signal thus produced at the collector of the transistor 100 is impressed upon the base of an emitter follower transistor 120 and is repeated across the emitter follower resistor 121 to the output terminal 122.

It will be noted that the Zener diode 37 provides a regulated DC voltage for the video portions of the circuit of FIG. 2 and the Zener diode 44 provides a regulated DC voltage for the horizontal drive and composite blanking pulse circuits. With this arrangement, interaction between the pulse and video portions of the circuit of FIG. 2 is minimized.

By way of example only, the following circuit constants have been found satisfactory in the arrangement of FIG. 2:

| Transistor: | Type |
|---|---|
| 32 | 2N1255 |
| 40 | 2N706A |
| 52 | 2N706A |
| 62 | 2N1255 |
| 70 | 2N644 |
| 72 | 2N644 |
| 90 | 2N706A |
| 93 | 2N1255 |
| 100 | 2N1255 |
| 112 | 2N706A |
| 120 | 2N1255 |

| Resistor: | Ohms |
|---|---|
| 33 | 56,000 |
| 42 | 1,200 |
| 48 | 1,000 |
| 53 | 75 |
| 54 | 3,300 |
| 55 | 2,200 |
| 56 | 15,000 |
| 63 | 4,700 |
| 74 | 2,200 |
| 75 | 820 |
| 77 | 8,200 |
| 78 | 1,500 |
| 82 | 22 |
| 83 | 4,700 |
| 91 | 150 |
| 92 | 1,800 |
| 94 | 470 |
| 95 | 470 |
| 101 | 1,500 |
| 103 | 680 |
| 106 | 560 |
| 110 | 1,200 |
| 111 | 220 |
| 113 | 3,900 |
| 116 | 33 |
| 121 | 2,200 |

| Capacitor: | | |
|---|---|---|
| 31 | microfarads | 0.1 |
| 38 | do | 250 |
| 45 | do | 25 |
| 46 | do | 250 |
| 47 | do | 250 |
| 51 | do | 50 |
| 60 | micromicrofarads | 560 |
| 73 | microfarads | 50 |
| 80 | do | 50 |
| 96 | do | 250 |
| 102 | micromicrofarads | 27 |
| 107 | do | 27 |
| 115 | microfarads | 250 |

| Potentiometer: | Ohms |
|---|---|
| 49 | 500 |
| 84 | 5,000 |
| 114 | 5,000 |

While there has been described what is at present considered to be the preferred embodiment of the present invention, it will be understood that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. In a television system, the combination of means for developing a video signal wave, a first reference voltage source, means for clamping said video signal wave to said reference voltage source during the retrace intervals of said video signal wave, a source of blanking pulses, and means for combining said clamped video wave with blanking pulses from said blanking pulse source while maintaining the blanking pulse level of the resultant waveform substantially constant during successive blanking intervals despite variations in the average value of said video wave.

2. In a television system, the combination of means for developing a video signal wave, a first reference voltage source, means for clamping said video signal wave to said reference voltage source during the retrace intervals of said video signal wave, a source of blanking pulses, means for combining said clamped video wave with blanking pulses from said blanking pulse source while maintaining the blanking pulse level of the resultant waveform substantially constant during successive blanking intervals, and means for varying the value of said reference voltage relative to the voltage of said resultant waveform during blanking intervals, thereby to vary the relationship of video components of said resultant waveform relative to said blanking intervals thereof.

3. In a television system, a black level setting control circuit comprising, means for developing a video signal wave, a first reference voltage source, means for clamping said video signal to said reference voltage source during the retrace intervals of said video signal wave, a second reference voltage source, a source of blanking pulses, a transistor, means for combining blanking pulses from said source with said clamped video signal and supplying the same to one electrode of said transistor, an output impedance connected between another electrode of said transistor and said second reference voltage source, said combined signal applied to said one electrode being of sufficient amplitude to cut off said transistor during the intervals of said blanking pulses, whereby the voltage at said other electrode corresponds to the voltage of said second reference voltage source during blanking intervals.

4. In a television system, a blank level setting control circuit comprising, means for developing a video signal wave, a first reference voltage source, means for clamping said video signal to said reference voltage source during the retrace intervals of said video signal wave, a second reference voltage source, a source of blanking pulses, a transistor, means for combining blanking pulses from said source with said clamped video signal and supplying the same to one electrode of said transistor, an output impedance connected between another electrode of said transistor and said second reference voltage source, said combined signal applied to said one electrode being of sufficient amplitude to cut off said transistor during the intervals of said blanking pulses, whereby the voltage at said other electrode corresponds to the voltage of said second reference voltage source during blanking intervals, said reference voltage source including means for maintaining the voltage thereof constant despite variations in the average value of said video signal.

5. An arrangement as set forth in claim 4 wherein one of said first and second reference voltage sources is variable to provide for variation in the relationship of video components of said combined signal relative to said blanking intervals.

6. In a television system, a black level setting control circuit comprising, means for developing a video signal wave, a first transistor, means for supplying said video signal wave to one electrode of said first transistor with the retrace intervals thereof maintained at the same voltage level, a source of blanking pulses, a second transistor, means for supplying blanking pulses from said source to one electrode of said second transistor, a common output impedance connected to both said first and second transistors in such manner that said video signal wave and said blanking pulses are combined thereacross, a third transistor directly coupled to said common output impedance, a source of reference voltage, an output resistor, and means connecting said reference voltage source and said output resistor in series to one electrode of said third transistor, said combined signal across said output impedance being of sufficient amplitude to cut off said third transistor during the intervals of said blanking pulses.

7. In a television system, a black level setting control circuit comprising, means for developing a video signal wave, a first transistor, means for supplying said video signal wave to one electrode of said first transistor with the retrace intervals thereof maintained at the same voltage level, a source of blanking pulses, a second transistor, means for supplying blanking pulses from said source to one electrode of said second transistor, a common output impedance connected to both said first and second transistors in such manner that said video signal wave and said blanking pulses are combined thereacross, a third transistor directly coupled to said common output impedance, a source of reference voltage, an output resistor, and means connecting said reference voltage source and said output resistor in series to one electrode of said third transistor, said combined signal across said output impedance being of sufficient amplitude to cut off said third transistor during the intervals of said blanking pulses, said source of reference voltage comprising a source of unidirectional potential, a voltage divider network connected across said unidirectional potential source, a fourth transistor having a base electrode connected to a point on said divider network and the collector thereof connected to one terminal of said source of unidirectional potential, and a resistive element connected between the emitter of said fourth transistor and the other terminal of said source of unidirectional potential.

8. In a television system, a gamma correction circuit comprising, a first transistor, means for supplying a composite video and blanking signal to one electrode of said first transistor, a variable source of D.C. voltage, a resistor, a second transistor, means connecting said resistor in series with the collector-base junction of said second transistor to said source of DC voltage, switching means for selectively connecting said resistor to another electrode of said first transistor, thereby to provide a sharp inflection point in the transfer characteristic of said first transistor when said collector-base junction of said second transistor conducts, and means for deriving an output signal from the collector of said first transistor.

9. In a television system, a gamma correction circuit comprising, a first transistor, means for supplying a composite video and blanking signal to one electrode of said first transistor, a resistor and condenser network connected to another electrode of said first transistor, a variable source of DC voltage, a second resistor, a second transistor, means connecting said second resistor in series with the collector-base junction of said second transistor to said source of DC voltage, a third resistor connected to said collector-base junction of said second transistor, switching means for selectively connecting said second and third resistors to said other electrode of said first transistor, thereby selectively to provide sharp inflection points at different portions of the transfer characteristic of said first transistor when said collector-base junction of said second transistor conducts, and means for deriving an output signal from the collector of said first transistor.

10. In a television system, a black level setting control circuit comprising, means for developing a video signal wave, a coupling capacitor, means for connecting said video signal wave to said capacitor, a first clamping transistor having one electrode thereof connected to said capacitor, a source of control pulses, a source of unidirectional potential connected to another electrode of said first transistor, means including a second transistor controlled by said control pulses for rendering said first transistor conductive, thereby to connect said capacitor to said source of unidirectional potential during the intervals of said control pulses, a source of blanking pulses, and means for combining the output of said first transistor with blanking pulses from said source while maintaining the voltage of the resultant waveform substantially constant during successive blanking intervals.

References Cited

UNITED STATES PATENTS

| | | | |
|---|---|---|---|
| 3,085,131 | 4/1963 | Diehl | 178—7.1 |
| 3,281,530 | 10/1966 | Sennhenn | 178—7.1 |
| 3,315,033 | 4/1967 | Sennhenn et al. | 178—7.1 |

ROBERT L. GRIFFIN, *Primary Examiner.*

JOHN W. CALDWELL, *Examiner.*

R. L. RICHARDSON, *Assistant Examiner.*